July 8, 1958 H. LANSKI 2,841,879
LAYOUT GUIDE CLAMP
Filed Jan. 7, 1957
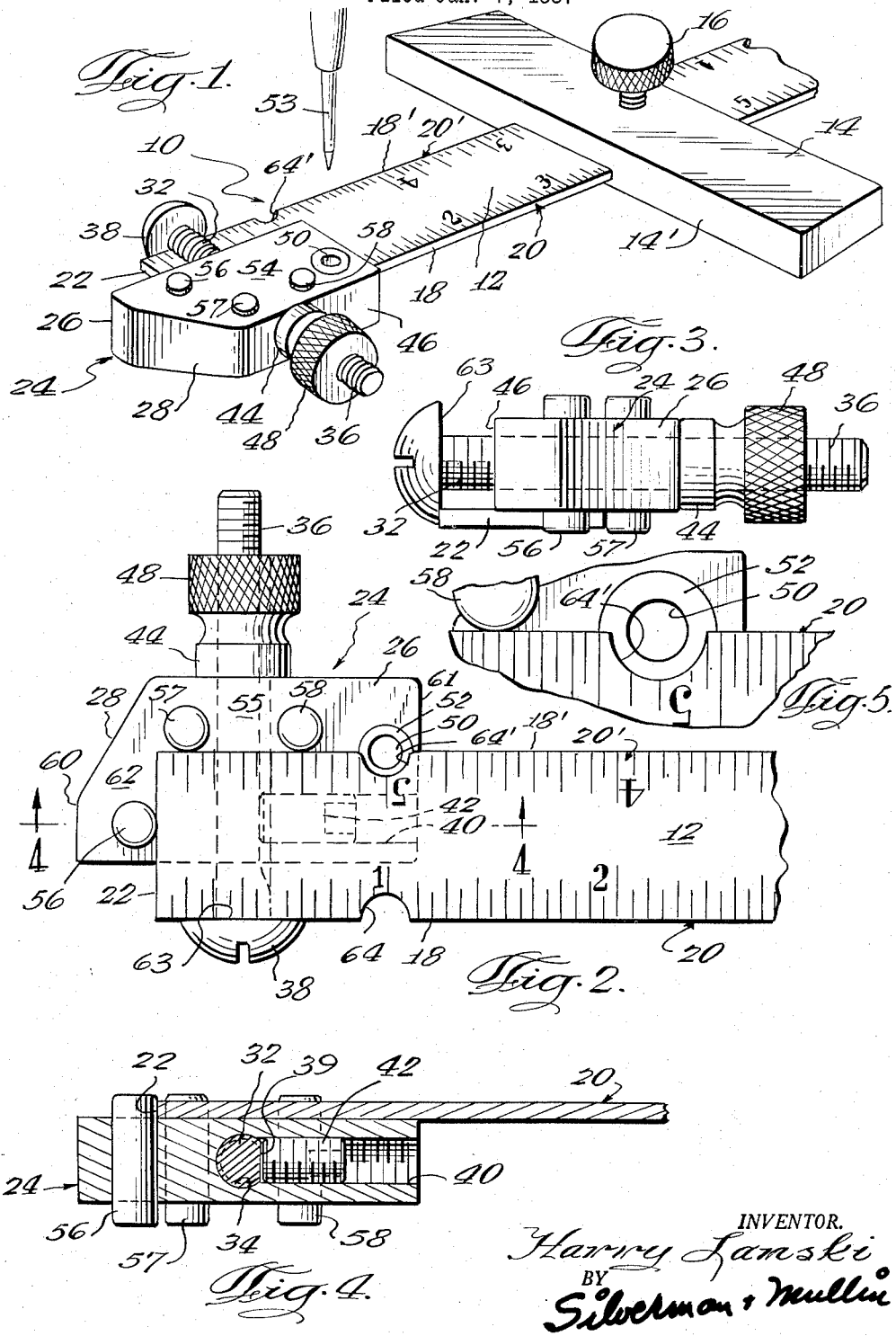
INVENTOR.
Harry Lanski
BY
Silverman + Mullin
attorneys United States Patent Office 2,841,879
Patented July 8, 1958

2,841,879

LAYOUT GUIDE CLAMP

Harry Lanski, Chicago, Ill.

Application January 7, 1957, Serial No. 632,766

8 Claims. (Cl. 33—189)

This invention relates generally to instruments for marking or layout work and more specifically, relates to improvements in such instruments comprising a novel layout guide clamp adapted to be detachably installed on one end of a rule or scale in either of two positions so that the instrument may be used in conjunction with both straight edges of the rule.

It is contemplated that the invention will have special advantages in the field of tool and die manufacture, where, for instance, the precise position of a hole is to be located and marked, however, uses for the invention in other fields likewise are contemplated. Heretofore, instruments of this type have been unsatisfactory in many respects, chief among which is believed attributable to the construction thereof in which the layout guide could function only in cooperation with one edge of the rule. Thus, where the tool or die presented protuberances or other deterrents to positioning of the instrument for layout work, it was inconvenient, if not impossible at times to use the instrument because of the more or less permanent installation of the layout guide on the rule. Accordingly, it is a principal object of this invention to provide a layout guide clamp of the character described which may be reversed in its installation on the rule so that either edge of the rule may be utilized.

Another object of the invention is to provide a layout guide clamp of the character described having stop means for properly positioning said clamp on the end of the rule in either of its two positions of use and clamping means for releasably securing said guide clamp in said positions.

Other advantages of the invention are believed to reside in the economical and sturdy construction of the guide clamp, the simple and easy manner with which same may be installed in its positions of use on the rule and the rapidity with which the layout work may be completed in accurate fashion by reason of the structural features of the invention.

The foregoing and other advantages of the invention will become apparent as the description thereof proceeds. To contribute to a full understanding of the principles of the invention and manner of practicing same, a preferred embodiment has been described in detail in the specification and illustrated in the acompanying drawing. Minor variations in the size, arrangement, proportion and construction of the several parts thereof may occur to the skilled artisan without sacrificing any of the advantages or departing from the principles of the invention.

In the drawing:

Fig. 1 is a perspective view of a layout guide instrument having the layout guide clamp embodying the invention installed in one of said two positions, there being shown a punch poised in position for insertion into the guide hole of the layout clamp.

Fig. 2 is a fragmentary bottom plan view of the instrument showing the layout clamp as installed in the second of said two positions.

Fig. 3 is an end-on view taken from the left-hand side of Fig. 2.

Fig. 4 is a sectional view taken along the line 4—4 of Fig. 2 and in the direction indicated.

Fig. 5 is a fragmentary bottom plan view of the guide clamp installed to show the cooperation between the guide hole in the clamp and a clearance notch in the rule.

Generally, the invention contemplates a layout guide clamp having a guide hole through which a marking tool, such as a punch, may be inserted to contact the work piece for layout work to be done on a die, for example. Said guide clamp is provided with releasable clamp means for securing same on one end of a rule or scale with the center of the guide hole coinciding or registering concurrently with a predetermined calibration along a straight edge of the rule and with the said straight edge. The layout clamp may be reversed in its installation so that the guide hole is aligned in the same manner with the opposite straight edge of the rule and stop means are provided on each surface of the layout clamp for properly positioning the layout clamp in either of the two positions of installation described. The rule is provided with a clearance notch in each straight edge thereof, one of said notches being aligned with the guide hole in either of said two positions of installation.

Referring now to the drawing, the layout marking instrument is designated generally by the reference character 10. Same includes a metal rule 12 slidably mounting a cross-head 14 which may be selectively locked in any position along the rule by means of the thumb screw 16. Each of the longitudinal or straight edges 18 and 18' of the rule is calibrated, such as in inches and fractions thereof, indicated by the respective scales 20 and 20', which may be etched or otherwise applied to one or both surfaces of the rule. As is common in such rules, the scales 20 and 20' are identically calibrated, albeit, reversed with respect to the end 22 of the rule so that the numerical values of scale 20 become progressively larger proceeding away from end 22 whereas the linear numerical values of scale 20' become progressively smaller. Removably secured on said end 22 is the layout guide clamp embodying the invention which is designated generally by the reference character 24.

The layout guide clamp 24 preferably is formed of hard metal, such as steel and includes a bed plate or block 26 preferably of generally rectangular configuration, although, as illustrated, a corner 28 thereof may be truncated to assist in handling of the layout clamp as will be more fully explained subsequently herein. The length of the bed plate 26 is selected to be greater than the smallest whole number graduation of said scales, which in the embodiment illustrated would be one inch. The width of the plate or block may vary within wide limits, as can the thickness thereof, although in the interests of economy the least dimension for each will be selected commensurate with the functions intended for the structure.

The means for releasably clamping the layout guide clamp on end 22 of the rule includes a long bolt, the shank 32 of which is loosely inserted for axial movement in the bore 34 arranged normal to the length of the plate 26. The shank 32 is greater in length than the bore so as to protrude outwardly from each end thereof. End 36 of said shank is threaded and the opposite end has an enlarged button head or cap 38, the diameter of which is greater than the combined thickness of the plate 26 and rule 12. To prevent rotation of the shank 32 in said bore, same may be flattened or squared as at 39 along a portion of the length thereof which engages in said bore and, of course, the bore may be formed of other than circular cross-section for achieving this purpose. One expedient for preventing rotation of the bolt is indicated in Fig. 4 which comprises a passageway 40 normal to bore 34 in which is accommodated a set screw 42 which may enter bore 34 sufficiently to prevent rotation of the bolt albeit, permit axial movement of the shank in said bore. Rotatably mounted on the protruding end 36 is a thumb nut 44 which may be advanced and retracted along said threaded end 36 relative the adjacent side face 46 of the plate 26. Said nut 44 may have an annular knurled head 48 to assist in rotation of the nut.

A guide hole 50 extends entirely through the plate perpendicular to the length thereof. Said hole 50 is provided with a bushing 52 forced in place, said bushing being formed of a hard metal, such steel, so as to be capable of withstanding considerable wear when a marking instrument, such the punch 53, is inserted therein.

Both the upper and lower surfaces of the layout guide clamp are provided with stop means for proper positioning of the clamp on the rule. For purposes of illustration, said surfaces have been designated respectively 54 and 55. Said stop means comprise a plurality of upstanding abutments or protuberances selectively arranged on each of said surfaces 54 and 55 to accurately position the layout clamp when installed so that the guide hole 50 is properly aligned for using the instrument in either of said two positions of installation. Said abutments or protuberances are provided by a plurality of cylindrical pins 56, 57 and 58 each of which is greater in length than the thickness of plate or block 26 so that the opposite ends of the pins protrude beyond the surfaces 54 and 55 respectively. The pins are rigidly secured in suitable passageways perpendicular to the lengthwise dimension of the plate and the axis of bore 34. The ends of the pins protrude upwardly from the surfaces 54 and 55 of the plate respectively, said protruding ends comprising the abutments or protuberances.

The space relationship between the pins 56, 57 and 58 and the center of the guide hole is predetermined to achieve registry of the center of the hole with a predetermined mark on a scale and the straight edge of the rule on which the scale is provided. The pin 56 is located adjacent one end 60 of the plate while the hole 50 is adjacent the opposite end 61 of said plate. A line drawn through the center of hole 50 perpendicular to a side face 46 of the plate would be spaced from a line perpendicular to a side face 46 and tangent to the pin 56 at a point thereon closest to the hole 50 a distance equal to the smallest whole number linear calibration of either scale 20 or 20' or one inch. Stated another way, the distance between lines drawn through the centers of hole 50 and pin 56 respectively and which are both perpendicular to a side face 46 would be one inch plus the radius of pin 56. The pins 57 and 58 are positioned so that their centers line on a straight line perpendicular to a line drawn to the center of pin 56 normal to the side face 46, which will be seen, provides an angle identical to that formed by either straight edge 18 or 18' with the end 22 of the rule. The pins 57 and 58 preferably are of the same diameter, although this is not strictly necessary.

To install the clamp 24, rule is laid flat on either surface 54 or 55 of the plate 26 with the end 22 abutting the pin 56 and a straight edge of the rule abutting pins 57 and 58. Thus, the pin 56 limits movement of the rule unidirectionally lengthwise along the plate 26 and the pins 57 and 58 limit movement of the rule unidirectionally laterally of the plate. There will be a portion 62 of the plate which protrudes beyond end 22 which in conjunction with truncated corner 28 will assist in handling and installation of the clamp. To clamp the rule to the layout clamp, the flat surface 63 of head 38 of the bolt is brought to bear against the opposite straight edge of the rule and the thumb nut 44 is rotated to advance same into bearing engagement with the adjacent face 46 of the plate 26. In this clamped position, the guide hole 50 will have its center registering concurrently with a predetermined calibration of a said scale 20 or 20' and the straight edge of the rule which abuts the stop pins 57 and 58.

Referring to Fig. 1, the clamp 24 is shown installed for operation in conjunction with the straight edge 18. It will be apparent that the head 38 of the bolt clamps against the opposite straight edge 18' of the rule whereas the nut 44 bears against a lateral face 46 of the plate 26. The center of guide hole 50 will be in registry with the "one inch" calibration of scale 20 and the straight edge 18. Proper positioning of the layout clamp on end 22 of the rule is achieved by the ends of pins 56, 57 and 58 protruding beyond surface 54 of the said plate.

Seen in Fig. 2 is a reversed position of the layout clamp. Secured on end 22, the layout clamp now has the guide hole 50 aligned with the "five inch" calibration of the scale 20', which, as seen, is opposite the "one inch" mark of scale 20. Also, the guide hole is in coincidence with the straight edge 18' whereas the head 38 now bears against edge 18 and nut 44 bears against the opposite lateral face of plate 26.

In each of the positions described, the center of guide hole 50 is aligned with a predetermined calibration of a scale, said calibrations being diametrically opposite one the other in location on the rule. In the embodiment described, three calibrations or marks are respectively the "five inch" and "one inch" marks of the scales 20' and 20 respectively. As best seen in Fig. 2, the rule 12 has a notch or recess 64 coinciding with the "one inch" mark of scale 20 and a notch 64' coinciding with the "five inch" mark of scale 20'. One of said notches 64 and 64' will be aligned with the guide hole 50 when the clamp 24 is installed in either of its two positions and thereby provide clearance for the punch 53 to penetrate to the work piece when the marking is to be done.

Since the shank 32 is longer than the width of plate 26 there is ample clearance for retracting the nut 44 so that the end 22 of the rule may be passed between the pins 57 and 58 and the head 38 for engagement with the pin 56. To reverse the installation of the layout clamp, the nut 44 is retracted from engagement with a lateral face 46 of said plate and the clamp lifted from the rule and inverted. It is then returned flat onto the rule in position guided by the stop pins and clamped by advancing nut 44 into bearing engagement with the plate. This may be done swiftly and accurately as required.

The manner in which the instrument may be used will be described in connection with the installation of Fig. 1 wherein guide hole 50 is in registry with the "one inch" mark of scale 20 and the straight edge 18. It is desired to mark a point on a line along which the straight edge 18 of the rule can be laid. This line may have been marked on a tool or die with another instrument. The point is spaced a predetermined distance from a side edge of the tool or die. The cross-head 14 is moved along the rule until it is spaced from the "one inch" mark of scale 20 a distance corresponding to the distance the said point is spaced from said side edge and locked by screw 16. The cross-head is laid along said side edge with the straight edge 18 laid along the line. Automatically, the guide hole 50 will be positioned with its center registering with said point since it is spaced from the cross-head the same distance as the "one inch" mark. The punch 53 is inserted in the guide hole and the mark made of said point at the precise location desired. It may be noted that by means of the cross-head there is no need for making a second line to intersect the first line mentioned at the precise point desired before making the layout.

It is believed the invention has been described in sufficient detail to enable the skilled artisan to practice and understand the same. It is desired that the invention be construed in the broadest terms commensurate with the progress contributed to the arts and sciences thereby and the principles thereof as set forth in the claims hereto appended.

I claim:

1. A layout marking instrument comprising, a rule having a recess in the calibrated edge thereof alined with a predetermined calibration, a layout guide clamp releasably secured on one end of the rule, said layout clamp having a guide hole therethrough and stop means engaging said end and calibrated edge to position the layout clamp with the center of the guide hole in registry with said calibration and edge concurrently and the recess aligned with the guide hole, means on the layout clamp for releasably clamping the same in said position, said stop means being provided on opposite surfaces of the layout clamp, said rule having a recess in the opposite straight edge thereof aligned with the first named recess, said stop means being arranged to permit selective installation of the layout clamp with the guide hole in registry with either of said edges and recesses concurrently.

2. An instrument as described in claim 1 in which said clamping means comprises a tightening screw engaged through said clamp with its ends protruding outwardly of the clamp, a fixed jaw member on one end of the screw and a movable jaw member threadedly engaged over the opposite end of the screw, said jaws being operative to so clamp said layout clamp with one jaw engaged against the rule and the other against the clamp in either of said two positions.

3. A layout marking instrument comprising, a rule having a calibrated edge and a recess in said edge coinciding with a predetermined calibration thereof, a layout guide clamp removably attached on one end of the rule, said clamp having a single guide hole therethrough, stop means comprising a plurality of rigid pins upstanding on each surface of said clamp, said means arranged to permit positioning of the guide clamp relative said end so that the center of the guide hole is in precise registry with said edge and calibration concurrently and the recess coincides with the guide hole, said clamp carrying movable jaws for releasably locking the clamp in said position, said pins being arranged on a pair of cross-lines forming a right angle the apex of which is spaced from the center of the guide hole a distance corresponding to the linear designation of the said calibration.

4. A marking instrument comprising, a rule having a first and second calibrated edge, a layout guide clamp detachably installed on an end of said rule, said guide clamp including a base plate having opposite planar surfaces and a guide hole therein opening at each end thereof to one of said surfaces, stop means on said planar surfaces for selectively positioning the guide clamp on said end of the rule with either of the surfaces engaged upon the rule and with the center of the guide hole simultaneously in substantial registry with either one of said calibrated edges and also with a predetermined calibration on this calibrated edge, means carried by the plate for releasably locking said guide clamp on the end of the rule in said selected position, each calibrated edge having a clearance notch coincident with the calibration thereof which can align with the hole when the guide clamp is locked in a said position, said locking means operable to permit the guide clamp to be reversed in its installation on the end of the rule for operative positioning relative either said first or second calibrated edges.

5. A marking instrument comprising, a rule having a first and second calibrated edge, a layout guide clamp detachably installed on an end of said rule, said guide clamp including a base plate having opposite planar surfaces and a guide hole therein opening at each end thereof to one of said surfaces, stop means on said planar surfaces for selectively positioning the guide clamp on said end of the rule with either of the surfaces engaged upon the rule and with the center of the guide hole simultaneously in substantial registry with either one of said calibrated edges and also with a predetermined calibration on this calibrated edge, means carried by the plate for releasably locking said guide clamp on the end of the rule in said selected position, each calibrated edge having a clearance notch coincident with the calibration thereof which can align with the hole when the guide clamp is locked in said position, said locking means operable to permit the guide clamp to be reversed in its installation on the end of the rule for operative positioning relative either said first or second calibrated edges, said stop means comprising a plurality of pins upstanding on each said surface of the plate.

6. A marking instrument comprising, a rule having a first and second calibrated edge, a layout guide clamp detachably installed on an end of said rule, said guide clamp including a base plate having opposite planar surfaces and a guide hole therein opening at each end thereof to one of said surfaces, stop means on said planar surfaces for selectively positioning the guide clamp on said end of the rule with either of the surfaces engaged upon the rule and with the center of the guide hole simultaneously in substantial registry with either one of said calibrated edges and also with a predetermined calibration on this calibrated edge, means carried by the plate for releasably locking said guide clamp on the end of the rule in said selected position, each calibrated edge having a clearance notch coincident with the calibration thereof which can align with the hole when the guide clamp is locked in said position, said locking means operable to permit the guide clamp to be reversed in its installation on the end of the rule for operative positioning relative either said first or second calibrated edges, said stop means comprising a plurality of rigid pins extending through the plate with the ends of the pins protruding beyond said planar surfaces normal to the plane of said surfaces.

7. A marking instrument comprising, a rule having a first and second calibrated edge, a layout guide clamp detachably installed on an end of said rule, said guide clamp including a base plate having opposite planar surfaces and a guide hole therein opening at each end thereof to one of said surfaces, stop means on said planar surfaces for selectively positioning the guide clamp on said end of the rule with either of the surfaces engaged upon the rule and with the center of the guide hole simultaneously in substantial registry with either one of said calibrated edges and also with a predetermined calibration on this calibrated edge, means carried by the plate for releasably locking said guide clamp on the end of the rule in said selected position, each calibrated edge having a clearance notch coincident with the calibration thereof which can align with the hole when guide clamp is locked in a said position, said locking means operable to permit the guide clamp to be reversed in its installation on the end of the rule for operative positioning relative either said first or second calibrated edges, said locking means comprising an elongate bolt inserted through the plate, said bolt having an enlarged head on one end thereof and a jaw member movable axially along the shank of the bolt on its opposite end, said rule being releasably gripped between the jaw member and enlarged head with lateral and longitudinal movement of the rule relative the guide clamp restricted by the stop means in either installed position of the guide clamp.

8. In a layout marking instrument of the character described, a layout guide clamp comprising a plate member having planar opposite surfaces, a guide hole transversely through the plate member opening to said surfaces at its opposite ends and a plurality of rigid pins upstanding from each of said normal to the plane of the plate member, the pins on each surface arranged in right angular configuration with the apex of the angle laterally spaced from the center of the guide hole an identical predetermined linear distance, releasable clamping means carried by the plate member for installing the guide clamp on the end of a rule comprising, an elongate bolt extending through the plate having relatively movable jaw means on the ends thereof exterior of the plate, said jaw means adapted to clamp the rule therebetween for installing the guide clamp on the end of the rule, said pins arranged to limit movement of the guide clamp relative to rule laterally and longitudinally thereof when so clamped on the end of the rule.

References Cited in the file of this patent

UNITED STATES PATENTS

| | | |
|---|---|---|
| 683,247 | Carter | Sept. 24, 1901 |
| 1,160,432 | Middleton | Nov. 16, 1915 |
| 2,007,329 | Flesselles | July 9, 1935 |
| 2,090,471 | Coffey | Aug. 17, 1937 |
| 2,591,814 | Hill | Apr. 8, 1952 |
| 2,592,877 | Ellington | Apr. 15, 1952 |
| 2,606,371 | Klimek | Aug. 12, 1952 |

UNITED STATES PATENT OFFICE
CERTIFICATE OF CORRECTION

Patent No. 2,841,879                                                                July 8, 1958

Harry Lanski

It is hereby certified that error appears in the printed specification of the above numbered patent requiring correction and that the said Letters Patent should read as corrected below.

Column 6, line 73, after "said" insert -- surfaces --.

Signed and sealed this 28th day of October 1958.

(SEAL)
Attest:

KARL H. AXLINE
Attesting Officer

ROBERT C. WATSON
Commissioner of Patents